United States Patent [19]
Barnett et al.

[11] Patent Number: 4,930,578
[45] Date of Patent: Jun. 5, 1990

[54] AUTOMATIC SPRINKLER

[75] Inventors: Charles B. Barnett; Leonid Rabinovich, both of Akron, Ohio

[73] Assignee: Figgie International, Inc., Willoughby, Ohio

[21] Appl. No.: 175,538

[22] Filed: Mar. 31, 1988

[51] Int. Cl.⁵ .............................................. A62C 37/14
[52] U.S. Cl. ...................................... 169/39; 169/37; 169/38; 169/40; 403/2; 137/70
[58] Field of Search ....................... 169/37, 38, 39, 40, 169/41, 42, DIG. 3; 403/2; 137/70; 248/548

[56] References Cited

U.S. PATENT DOCUMENTS

| | | | |
|---|---|---|---|
| 1,608,515 | 11/1926 | Lowe | 261/11.41 |
| 2,122,426 | 7/1938 | Knight | 169/42 |
| 2,125,510 | 8/1938 | Lewis | 169/38 |
| 4,619,327 | 10/1986 | Pieczykolan | 169/38 |
| 4,739,835 | 4/1988 | Polan | 168/38 |

FOREIGN PATENT DOCUMENTS 2225215 12/1972 Fed. Rep. of Germany ........ 169/38

Primary Examiner—Joseph F. Peters, Jr.
Assistant Examiner—Chris P. Ellis
Attorney, Agent, or Firm—Jones, Day, Reavis & Pogue

[57] ABSTRACT

An automatic sprinkler having a force transmitting mechanism for releasably maintaining a water outlet closed includes a frangible glass bulb having a very quick response characteristic to thermal input. Substantially less than one-half the force transmitted through the force transmitting mechanism is carried by the glass bulb.

35 Claims, 2 Drawing Sheets

AUTOMATIC SPRINKLER

BACKGROUND OF THE INVENTION

This application relates to the art of temperature responsive force transmitting mechanisms and, more particularly, to such mechanisms that collapse when a predetermined temperature is reached. The invention is particularly applicable for use with automatic sprinklers, and will be described with specific reference thereto. However, it will be appreciated that the invention has broader aspects, and can be used in other environments.

A known type of automatic sprinkler includes force transmitting means for releasably closing an outlet for fire extinguishing fluid. The force transmitting means is commonly a frangible glass bulb containing a substance that expands in response to thermal input for breaking the bulb. This opens the outlet for the fire extinguishing fluid.

In automatic sprinklers of the type described, when the glass bulb is the sole means for transmitting the force to close the outlet, the bulb must have a relatively high structural strength. This means that the bulb is less fragile, and its response time is relatively long, because a substantial pressure must build up within the bulb before it breaks. An arrangement has been proposed wherein approximately one-half of the force is transmitted through the glass bulb, and the other half through a rigid strut. However, even when one-half of the force is transmitted through the bulb, it must have a relatively high structural strength, and this significantly reduces its thermal response time.

It would be desirable to have an arrangement allowing the use of a highly fragile glass bulb having a very quick thermal response characteristic.

SUMMARY OF THE INVENTION

An automatic sprinkler of the type described includes force transmitting means through which force is transmitted for releasably holding an outlet for fire extinguishing fluid closed. The force transmitting means includes strut means and frangible means. Input force dividing means divides the transmitted force such that substantially less than one-half the force is transmitted through the frangible means.

In a preferred arrangement, the force transmitted through the frangible means is not more than about one-third of the total transmitted force, or the force holding the outlet closed, and is preferably substantially less than one-third of the total force. In a most preferred arrangement, not more than about one-eighth of the force is transmitted through the frangible means.

Force combining means is provided for combining the forces transmitted through the strut means and the frangible means, and applying same to a closure that normally closes the outlet for fire extinguishing fluid.

In one arrangement, the outlet closure and the force applying means on the sprinkler are substantially centered along a common longitudinal axis. The force transmitting means includes substantially rigid strut means that extends substantially parallel to the longitudinal axis. In one arrangement, the frangible means also extends substantially parallel to the longitudinal axis, and is spaced outwardly therefrom a substantially greater distance than the substantially rigid strut means.

In a preferred arrangement, the frangible means extends across the longitudinal axis such that its opposite end portions are located on opposite sides of the axis. This advantageous arrangement maximizes contact between the frangible means and air moving past the sprinkler in all directions.

The strut means and frangible means have force input end portions and force output end portions The force input end portion of the frangible means is preferably spaced further from the force input means than the force input end portion of the strut means.

The force dividing means has a hole therethrough, and at least a portion of the force input end portion of the frangible means is received in such hole.

The force combining means has a hole therethrough, and at least a portion of the force output end portion of the frangible means is received in such hole. In one arrangement, a tail on the force output end portion of the frangible means extends completely through the hole in the force combining means. Protective means is positioned in surrounding relationship to such tail for protecting same against accidental breakage.

It is a principal object of the invention to provide an automatic sprinkler that has a very quick thermal response characteristic.

It is also an object of the invention to provide an improved force transmitting mechanism that includes frangible means through which substantially less than one-half of the transmitted force is carried.

It is a further object of the invention to provide an automatic sprinkler with improved force transmitting means that allows use of a highly sensitive glass bulb having a very quick thermal response characteristic.

It is an additional object of the invention to provide a force transmitting mechanism and a sprinkler of the type described that are reliable in operation, and economical to manufacture and assemble.

DESCRIPTION OF PREFERRED EMBODIMENTS

Figure 3:
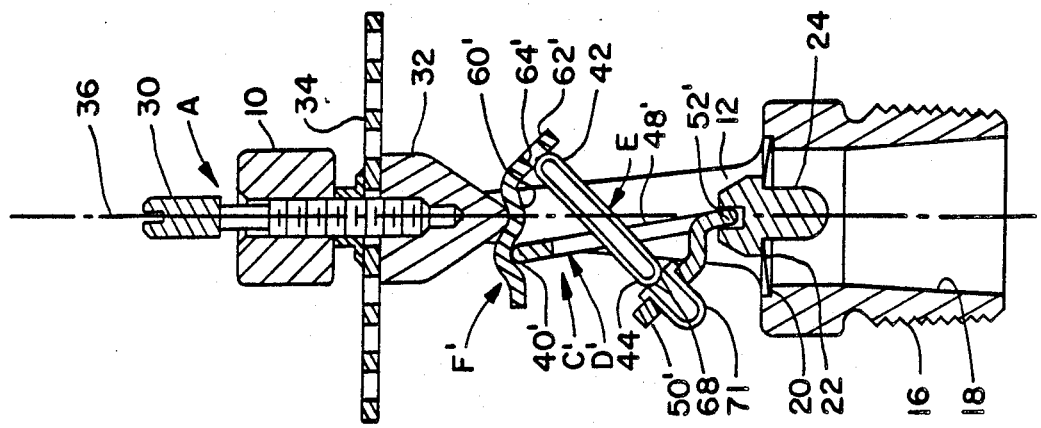
FIG. 3 is a view similar to FIG. 2, and showing an alternative arrangement.

Referring now to the drawing, wherein the showings are for purposes of illustrating certain preferred embodiments of the invention only, and not for purposes of limiting same, an automatic sprinkler A includes a yoke member B having a substantially horizontal support 10. A pair of opposite legs 12, 14 extend downwardly from the opposite end portions of support 10, and converge toward externally threaded plug 16 through which an outlet 18 is provided for fire extinguishing fluid.

Outlet 18 has a circumferential 1 seat 20 cooperating with a peripheral portion of closure means 22 for releasably holding outlet 18 closed. Closure means 22 may be in the form of an upwardly bowed spring disc coated with a suitable gasket material in a known manner. A cap member 24 is sealingly secured in a central hole in closure means 22, and has an upwardly facing slot or opening for receiving a projection on a force transmitting means.

A central threaded hole through a laterally enlarged portion of support 10 receives an adjusting screw 30 carrying input force applying means 32 on its free end portion inside of support 10 A deflector 34 is carried by input force applying means 32 for deflecting fire extinguishing fluid flowing through outlet 18 in a known manner. Closure means 22 and input force applying means 32 are substantially centered on a common longitudinal axis 36.

Force transmitting means C is in the form of a force transmitting mechanism interposed between input force applying means 32 and closure mean 22 for transmitting force therebetween. Force transmitting mean C includes substantially rigid strut means D and frangible means E. Strut means D include an upright strut portion 48 and an integral laterally extending strut portion 50. Upright strut portion 48 and frangible means E have force input end portions 40, 42, and force output end portions 42, 44. An integral projection 52 lying on longitudinal axis 36 is received in the slot or opening in cap member 24 attached to closure means 22.

Figure 2:
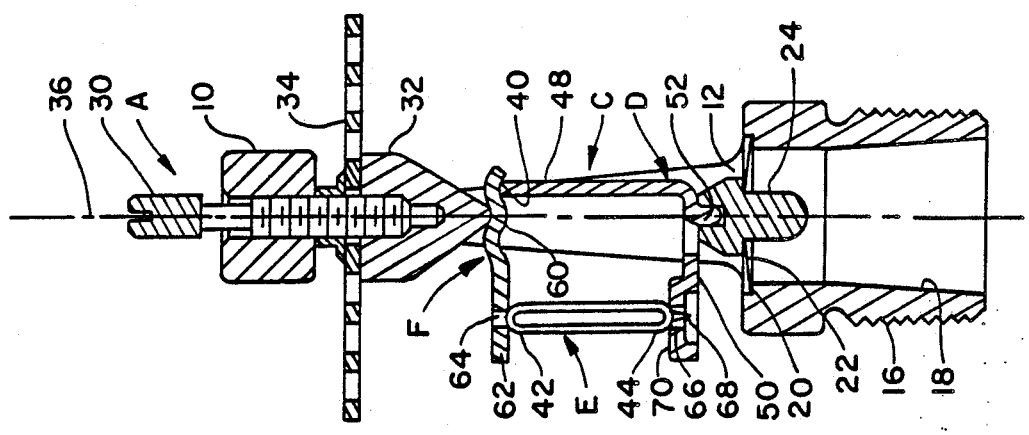
FIG. 2 is a cross-sectional elevational view taken generally on line 2—2 of FIG. 1.

In the arrangement shown in FIG. 2, strut means D has a generally reversed L-shaped configuration. Lateral strut portion 50 defines a force combining means for combining the forces transmitted through upright strut portion 48 and frangible means E, and applying the combined forces through projection 52 to closure means 22.

Force dividing means F is interposed between input force applying means 32, and force input end portions 40, 42 of strut means D and frangible means E. Force dividing means F is deformed as at 60 to provide a dimple receiving the rounded nose on input force applying means 32. Force applying means F is also arcuately bent or dimpled to provide an arcuate recess that receives force input end portion 40 of upright strut portion 48.

Force dividing means F is downwardly bent to provide a frangible means mounting portion 62 having a hole 64 therethrough for at least partly receiving rounded force input end portion 42 on frangible means E. Force input end portion 42 on frangible means E is spaced substantially further from input force applying means 32 than force input end portion 40 on upright strut portion 48.

Force output end portion 44 of frangible means E is partly received in a hole 66 through force combining means 50. A tail 68 on force output end portion 44 extends completely through hole 66, and is protectively surrounded by a boss 70 formed in force combining means 50, and through which boss the hole 66 is formed. Tail 68 is received in the recess portion of boss 70 on the opposite side of hole 66 from frangible means E. Thus, protective means is provided for protecting highly fragile tail 68 against breakage.

In the arrangement shown in FIG. 2, upright strut portion 48 and frangible means E extend substantially parallel to longitudinal axis 36. Frangible means E is spaced outwardly from axis 36 a substantially greater distance than upright strut portion 48. The spacing of upright strut portion 48 and frangible means E from axis 36, along with the design of force dividing means F, are such that the force transmitted through frangible means E from force input applying means 32 to closure means 22 is substantially less than one-half of the total force that is transmitted through the force transmitting means C. In a preferred arrangement, the force transmitted through frangible means E is not greater than about one-third of the total force transmitted. In a most preferred arrangement, the force transmitted through frangible means E is not greater than about one-eighth of the total force that is transmitted through the force transmitting means C.

When the sprinkler is assembled, adjustment screw 30 is manipulated to provide the desired amount of force acting on closure means 22 for maintaining outlet 18 closed against the pressure acting on closure mean 22 by fire extinguishing fluid. In the event of a fire, an expandable substance, such as alcohol, contained within the glass tube defining frangible means E, expands very rapidly, and breaks frangible means E. This allows force dividing means F to rotate counterclockwise in FIG. 2 about force input end portion 40 of upright strut portion 48. Force dividing means F will then fall away as upright strut portion 48 starts rotating clockwise in FIG. 2. The pressure acting on closure means 22 then blows same from seat 20, and strut means D falls away from the sprinkler. The fire extinguishing fluid flowing through outlet 18 then strikes deflector 34 for distributing such fluid throughout an area.

In the arrangement of FIG. 3, the force transmitting means is of a different type and is designated C'. Frangible means E in FIG. 3 is the same as in FIG. 2, and has been identified using the same letters and numerals. Strut means D' in FIG. 3 is different from the strut means of FIG. 2 and has been identified by the same numerals with a prime (') added.

In FIG. 3, force dividing means F' has its frangible means mounting portion 62' extending at an included angle of about 45° with longitudinal axis 36. Likewise, force combining means 50' integral with strut means D' extends at an included angle of about 45° with longitudinal axis 36. Thus, force combining means 50' and frangible means mounting portion 62' extend substantially parallel to one another.

In the arrangement of FIG. 3, upright strut portion 48' is slightly inclined to longitudinal axis 36, and this angle is preferably not greater than about 5°. Frangible means E extends across longitudinal axis 36, and its opposite force input and force output end portions 42, 44 are located on opposite sides of axis 36.

The hole in force combining means 50' for receiving a portion of force output end portion 44 on frangible means E contains a thimble 70 defining protective means for protecting highly fragile tail 68 on frangible means E.

In the arrangement of FIG. 3, frangible means E transmits substantially less than one-half of the total force transmitted through force transmitting C' from input force applying means 32 to closure means 22. The amount of force transmitted through frangible means E is preferably not more than about one-third of the total force, and most preferably not more than about one-eighth of the total force. When the expandable substance in the glass bulb defined in frangible means E responds to thermal input, frangible means E breaks to allow force dividing means F' to rotate clockwise in FIG. 3 about force input end portion 40' of upright strut portion 48'. This allows strut means D' to rotate counterclockwise in FIG. 3 generally about projection 52' as the pressure in outlet 18 blows closure means 22 from seat 20.

In the arrangement of FIG. 3, force combining means 50' may be struck from an intermediate portion of strut upright portion 48' so that frangible means E extends through the opening thereby created. This provides some protection on opposite sides of frangible means E.

Arranging frangible means E to carry a very small fraction of the transmitted force makes it possible to use a more highly fragile glass bulb having a very quick response time to thermal input.

The glass bulb defining frangible means E is preferably designed such that it is incapable of carrying one-half the transmitted force under installed conditions for sustained periods. Obviously, it is possible to practice the principal features of the present invention by using a frangible means that is capable of carrying one-half the transmitted force. However, such an arrangement is not preferred.

Figure 1:
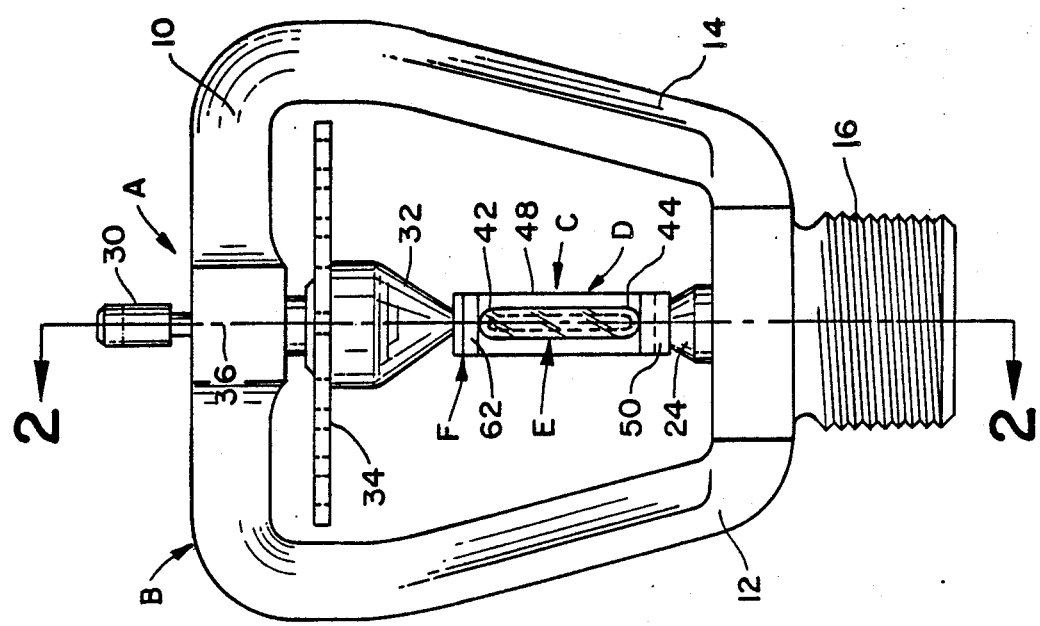
FIG. 1 is an elevational view of an automatic sprinkler having the improvements of the present application incorporated therein.

In the arrangement of FIG. 2, frangible means E lies in a plane extending perpendicular to the common plane of yoke legs 12, 14. This makes it easier to install the force transmitting mechanism. Instead of being offset from the common plane of legs 12, 14 by 90°, the frangible means could simply be offset a smaller amount. As shown in FIG. 1, the widths of both force dividing means F and force combining means 50 are substantially wider than the diameter or width of frangible means E. Also, as shown in FIG. 2, both force dividing means F and force combining means 50 extend outwardly beyond frangible means E. This provides protection for frangible means E during handling, shipping, storage and installation. Locating frangible means E out of the common plane of legs 12, 14 also allows better circulation of hot air over the frangible means without interference by one of the legs.

In FIG. 3, frangible means E preferably intersects axis 36. However, frangible means can be inclined as shown in FIG. 3 while being offset from axis 36. In FIG. 3, frangible means E also extends through the common plane in which yoke legs 12, 14 lie. While this is the preferred arrangement, frangible means E could also be inclined in the common plane for legs 12, 14, or in intermediate positions.

The highly advantageous and preferred arrangement of FIG. 3 provides maximum contact with the glass bulb by air currents moving past the sprinkler in all directions. While an inclination of about 45° is preferred for the glass bulb, it is possible to provide a less preferred inclination of from 40°-50°. Inclinations outside of the less preferred range are also possible and within the scope of the present application.

Figure 4:
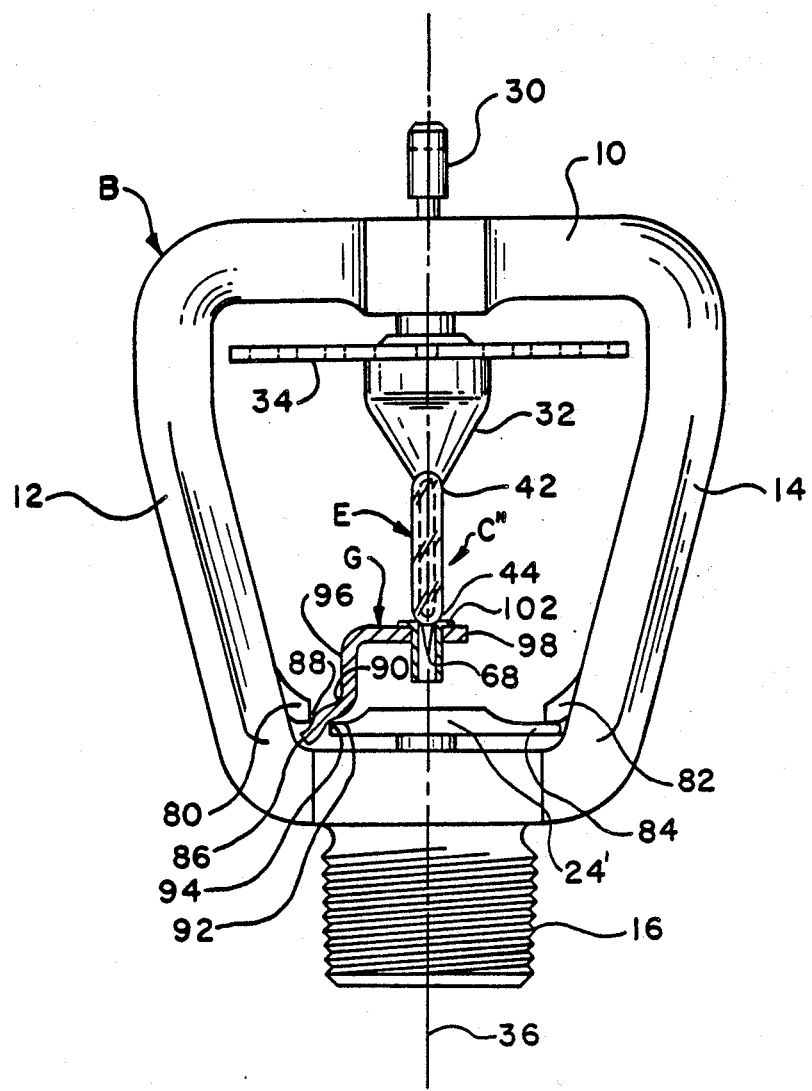
FIG. 4 is an elevational view similar to FIG. 1, and showing another embodiment.

FIG. 4 shows force transmitting means C'' including a glass bulb E and a force multiplying means in the form of a lever G.

Opposed projections 80, 82 on yoke legs 12, 14 extend toward one another. A flat circular cap member disc 24' that is part of the outlet closure means for the sprinkler outlet has a peripheral portion 84 received beneath projection 82.

Lever G has a tail portion 86 received beneath projection 80 and cooperating with a knife edge thereon to provide a lever pivot axis 88 extending perpendicular to the plane of the paper. Lever G has an offset portion 90 engaging the upper surface of a peripheral portion 92 of disc 24' in an engagement area 94.

Lever G has upright and horizontal legs 96, 98. A hole through horizontal leg 98 coincides with sprinkler axis 36, and receives a thimble 102 for protecting bulb tail 68. Bulb force output end portion 44 is partly received in thimble 102, and bulb force input end portion 42 engages force applying means 32.

Lever pivot axis 88 is spaced a substantial distance outwardly from sprinkler axis 36. Engagement area 94 between lever G and outlet closure disc 24' is located intermediate lever pivot axis 88 and sprinkler axis 36. Glass bulb force output end portion 44 engages lever G at a location substantially closer to sprinkler axis 36 than engagement area 94. Preferably, the location of engagement between bulb and lever coincides with sprinkler axis 36.

Lever pivot axis 88, engagement area 94, and the location of engagement between bulb and lever are located such that the force transmitted through bulb E is substantially less than one-half of the force applied to outlet closure disc 24' at engagement area 94. Preferably, the force transmitted through bulb E is not greater than about one-third of the force applied in engagement area 94, and most preferably, the force transmitted through bulb E is not greater than about one-fourth of the force applied in engagement area 94.

When bulb E in FIG. 4 fractures, the fluid pressure acting on the outlet closure pivots outlet closure disc 24' about its portion 84 received beneath projection 82. This pivots lever G counterclockwise about lever pivot axis 88. Both the lever and disc will become displaced from beneath their respective projections 80, 82, and will fall away to allow free flow through the sprinkler outlet.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A force transmitting mechanism including strut means and frangible means for transmitting force longitudinally therethrough, each of said strut means and frangible means having a force input end portion and a force output end portion, said force input end portions being spaced-apart, output force combining means for combining the output forces from said force output end portions, and input force dividing means for dividing an input force between said force input end portions such that substantially less than one-half of the input force is transmitted through said frangible means and the remainder of the input force is transmitted through said strut means.

2. The mechanism of claim 1 wherein said input force dividing means is positioned for dividing an input force such that not more than about one-third of the input force is transmitted through said frangible means.

3. The mechanism of claim 1 wherein said input force dividing means is positioned for dividing an input force such that not more than about one-eighth of the input force is transmitted through said frangible means.

4. The mechanism of claim 1 wherein said frangible means and said strut means extend substantially parallel to one another.

5. The mechanism of claim 1 wherein said frangible means is inclined relative to said strut means.

6. The mechanism of claim 1 wherein said output force combining means is integral with said strut means.

7. The mechanism of claim 1 wherein said force input and output end portions of said frangible means are on opposite sides of said strut means.

8. The mechanism of claim 1 wherein said strut means extends substantially straight between said force combining means and said force dividing means.

9. The mechanism of claim 1 wherein said input force dividing means has a hole therethrough at least partly receiving said force input end portion of said frangible means.

10. The mechanism of claim 1 wherein said force combining means has a hole therethrough at least partly receiving said force output end portion of said frangible means.

11. The mechanism of claim 10 wherein said frangible means comprises a sealed glass tube and said force output end portion of said glass tube includes a tail extending through said hole, and protective means surrounding said tail on the opposite side of said force combining means from said glass tube.

12. An automatic sprinkler including an outlet for fire extinguishing fluid, closure means for normally closing said outlet and being movable to an open position, force applying means spaced from said closure means, force transmitting means interposed between said closure means and said force applying means for releasably holding said closure means in a position closing said outlet, said force transmitting means including frangible means for collapsing said force transmitting means to move said closure means to said open position when said frangible means breaks, and said frangible means carrying substantially less than one-half of the force carried by said force transmitting means for normally holding said closure in a position closing said outlet.

13. The sprinkler of claim 12 wherein said force transmitting means includes said frangible means and substantially rigid strut means, said frangible means and said strut means having force input end portions, and force dividing means interposed between said force applying means and said force input end portions.

14. The sprinkler of claim 13 wherein said force input end portion of said frangible means is spaced further from said force applying means than said force input end portion of said strut means.

15. The sprinkler of claim 12 wherein said closure means and said force applying means are substantially centered on a common longitudinal axis, and said strut means extends substantially parallel to said axis.

16. The sprinkler of claim 15 wherein said frangible means extends across said axis.

17. The sprinkler of claim 15 wherein said frangible means extends substantially parallel to said axis and is spaced outwardly from said axis a substantially greater distance than said strut means.

18. An automatic sprinkler including a water outlet, closure means having a closed position for normally closing said outlet and an open position for providing flow of fire extinguishing fluid through said outlet, force applying means generally axially-spaced from said outlet and closure means, force transmitting means interposed between said closure means and said force applying means for normally holding said closure means in said closed position and being collapsible for moving said closure means to said open position, said force transmitting means including frangible means and strut means, force dividing means interposed between said force applying means and said force transmitting means for dividing the force transmitted through said force transmitting means from said force applying means to said closure means such that substantially less than one-half of the transmitted force is transmitted through said frangible means.

19. The sprinkler of claim 18 wherein not greater than about one-third of the transmitted force is transmitted through said frangible means.

20. The sprinkler of claim 18 wherein not greater than about one-eighth of the transmitted force is transmitted through said frangible means.

21. The sprinkler of claim 18 including a yoke frame having a pair of opposite legs lying in a common plane, and said frangible means being located outside of said common plane.

22. The sprinkler of claim 18 including force combining means for combining the forces transmitted through said frangible means and strut means and applying the combined force to said closure means, each said force dividing means and said force combining means extending outwardly beyond said frangible means on all sides thereof.

23. An automatic sprinkler including a yoke frame having a longitudinal axis and a pair of legs lying in a common plane, force transmitting means within the space between said legs for releasably holding an outlet closure in a closed position, said force transmitting means including an elongated glass bulb inclined at a substantial angle to said axis, whereby said glass bulb has maximum exposure to air currents moving in all directions relative to said axis, including both parallel and perpendicular thereto.

24. The sprinkler of claim 23 wherein said bulb extends across said axis.

25. The sprinkler of claim 23 wherein said bulb extends through said plane.

26. The sprinkler of claim 23 wherein said force transmitting means includes a strut having an opening therein through which said bulb extends.

27. The sprinkler of claim 23 wherein said bulb is inclined to said axis at an angle of approximately 40°–50°.

28. A force transmitting mechanism for an automatic sprinkler comprising a lever, strut and glass bulb, said strut and bulb having force input and output end portions, said lever being positioned in cooperative relationship with said force input end portions for dividing an input force such that substantially less than one-half of such force is transmitted through said bulb and the remainder of such force is transmitted through said strut means.

29. The mechanism of claim 28 wherein said bulb and strut cross over one another intermediate their input and output end portions.

30. The mechanism of claim 28 including an automatic sprinkler having a longitudinal axis, force applying means and an outlet closure spaced-apart along said axis, said force transmitting mechanism being positioned between said force applying means and said outlet closure with said force applying means engaging said lever, and force combining means for combining the forces transmitted through said bulb and strut at said force output end portions thereof and applying same to said outlet closure.

31. The sprinkler of claim 30 wherein said bulb extends across said axis.

32. The sprinkler of claim 31 wherein said strut has an opening therein through which said bulb extends.

33. An automatic sprinkler having a longitudinal axis, force applying means and an outlet closure spaced-apart along said axis, a lever having a pivot axis spaced outwardly from said longitudinal axis and engaging said outlet closure at an engagement area intermediate said pivot axis and said longitudinal axis, and a frangible bulb positioned between said lever and said force applying means and engaging said lever at a location substantially closer to said longitudinal axis than said engagement area.

34. The sprinkler of claim 33 wherein said bulb is substantially coincidental with said longitudinal axis.

35. The sprinkler of claim 33 wherein said pivot axis, said engagement area and said location at which said bulb engages said lever are situated such that the force transmitted through said bulb is substantially less than one-half of the force applied to said closure member by said lever.

* * * * *